(12) United States Patent
Yoshimoto et al.

(10) Patent No.: US 9,174,610 B2
(45) Date of Patent: Nov. 3, 2015

(54) WIPER BLADE AND WIPER FOR VEHICLE

(75) Inventors: Takao Yoshimoto, Toyohashi (JP); Naoki Torii, Toyohashi (JP); Masahiro Oota, Hamamatsu (JP); Masahiro Kitamura, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 347 days.

(21) Appl. No.: 13/612,112

(22) Filed: Sep. 12, 2012

(65) Prior Publication Data

US 2013/0239356 A1    Sep. 19, 2013

(30) Foreign Application Priority Data

| Sep. 15, 2011 | (JP) | 2011-202127 |
| Sep. 26, 2011 | (JP) | 2011-209896 |
| Sep. 26, 2011 | (JP) | 2011-209897 |
| Sep. 28, 2011 | (JP) | 2011-212713 |
| Jul. 30, 2012 | (JP) | 2012-168528 |

(51) Int. Cl.
*B60S 1/38* (2006.01)
*B60S 1/40* (2006.01)

(52) U.S. Cl.
CPC .. *B60S 1/38* (2013.01); *B60S 1/381* (2013.01); *B60S 1/3851* (2013.01); *B60S 1/3863* (2013.01); *B60S 1/4048* (2013.01); *B60S 1/3856* (2013.01); *B60S 1/3858* (2013.01); *B60S 1/3881* (2013.01); *B60S 2001/4051* (2013.01); *B60S 2001/4054* (2013.01)

(58) Field of Classification Search
CPC .... B60S 1/4045; B60S 1/4048; B60S 1/4038; B60S 1/4039; B60S 1/381; B60S 1/3848; B60S 1/3851; B60S 1/3856; B60S 1/3863; B60S 1/3858; B60S 1/3881

USPC ............. 15/250.32, 250.43, 250.44, 250.201, 15/250.361
See application file for complete search history.

(56) References Cited

U.S. PATENT DOCUMENTS

| 6,599,051 | B1 | 7/2003 | Jarasson |
| 6,634,055 | B1 | 10/2003 | De Block |
| 7,370,385 | B2 | 5/2008 | Chiang |
| 7,647,669 | B2 | 1/2010 | Chen |
| 7,832,047 | B2 | 11/2010 | Herinckx et al. |
| 7,996,953 | B2 | 8/2011 | Braun et al. |
| 8,307,494 | B2 | 11/2012 | Boland |
| 8,341,801 | B2 | 1/2013 | Coos |
| 8,402,595 | B2 | 3/2013 | Boland |

(Continued)

FOREIGN PATENT DOCUMENTS

| DE | 10036115 A1 * | 1/2003 |
| FR | 2 922 502 A1 | 4/2009 |

(Continued)

*Primary Examiner* — Gary Graham
(74) *Attorney, Agent, or Firm* — Christensen Fonder P.A.

(57) ABSTRACT

A wiper blade includes a wiper strip, a backing, a blade holder coupled to the wiper arm, and two opposed cases arranged at two longitudinal ends of the blade holder. The blade holder includes a blade holding portion, which surrounds a base portion of the wiper strip and the backing at a longitudinally central portion of the wiper strip and the backing. The blade holding portion restricts movement of the wiper strip and the backing in a direction orthogonal to the longitudinal direction. Each case includes a case holding portion that surrounds the base portion of the wiper strip and the backing. The case holding portion restricts movement of the wiper strip and the backing in a direction orthogonal to the longitudinal direction.

23 Claims, 9 Drawing Sheets

(56) References Cited

U.S. PATENT DOCUMENTS

| | | |
|---|---|---|
| 8,495,787 B2 | 7/2013 | Garrastacho et al. |
| 8,544,139 B2 | 10/2013 | Chien |
| 2004/0019997 A1* | 2/2004 | Baseotto et al. ............ 15/250.32 |
| 2006/0021177 A1 | 2/2006 | Marmoy et al. |
| 2006/0037167 A1* | 2/2006 | Nacamuli ................ 15/250.201 |
| 2006/0107485 A1 | 5/2006 | Kim |
| 2006/0156529 A1 | 7/2006 | Thomar et al. |
| 2007/0011840 A1 | 1/2007 | Gilli |
| 2007/0192983 A1 | 8/2007 | Chen |
| 2008/0066254 A1* | 3/2008 | Vacher ..................... 15/250.32 |
| 2008/0289133 A1* | 11/2008 | Kim .................... B60S 1/387 15/250.32 |
| 2009/0013492 A1 | 1/2009 | Henin |
| 2009/0056049 A1 | 3/2009 | Jarasson et al. |
| 2009/0064438 A1 | 3/2009 | Boland et al. |
| 2009/0064440 A1 | 3/2009 | Boland |
| 2009/0172910 A1 | 7/2009 | De Block et al. |
| 2009/0178226 A1* | 7/2009 | Lee et al. ................. 15/250.32 |
| 2009/0282637 A1 | 11/2009 | Weber et al. |
| 2010/0218330 A1* | 9/2010 | Fink et al. ................ 15/250.32 |
| 2010/0242204 A1 | 9/2010 | Chien |
| 2010/0319154 A1 | 12/2010 | Bousset |
| 2011/0056041 A1* | 3/2011 | Wu .................... B60S 1/3858 15/250.32 |
| 2011/0107542 A1* | 5/2011 | Op't Roodt ............... 15/250.31 |
| 2011/0113580 A1* | 5/2011 | Caillot et al. ............. 15/250.01 |
| 2011/0247167 A1* | 10/2011 | Huang ..................... 15/250.32 |
| 2013/0067678 A1 | 3/2013 | Ehde |
| 2014/0352099 A1 | 12/2014 | Fujiwara et al. |

FOREIGN PATENT DOCUMENTS

| | | |
|---|---|---|
| JP | 2002-533261 | 10/2002 |
| JP | 2002-534311 | 10/2002 |
| JP | 3107550 U | 2/2005 |
| JP | 2005-524567 A | 8/2005 |
| JP | 2006-500273 | 1/2006 |
| JP | 2006-103563 A | 4/2006 |
| JP | 2006-513928 | 4/2006 |
| JP | 2007-203948 A | 8/2007 |
| JP | 2007-531663 | 11/2007 |
| JP | 4791486 | 7/2008 |
| JP | 2008-285140 A | 11/2008 |
| JP | 2010-500949 A | 1/2010 |
| JP | 3160871 U | 7/2010 |
| JP | 2010-179921 A | 8/2010 |
| JP | 2012-136150 | 7/2012 |
| WO | WO 00/38964 | 7/2000 |
| WO | WO 02/40328 A1 | 3/2002 |
| WO | WO 2004/028875 | 4/2004 |
| WO | WO 2004/076252 | 9/2004 |
| WO | WO 2005/108176 | 11/2005 |
| WO | WO 2005/118363 | 12/2005 |
| WO | WO 2006/079591 | 8/2006 |

* cited by examiner

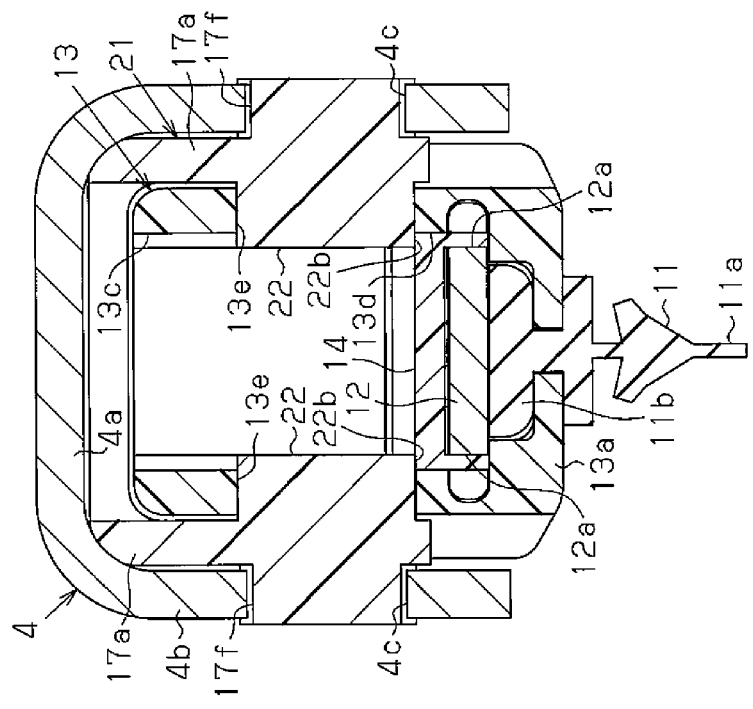
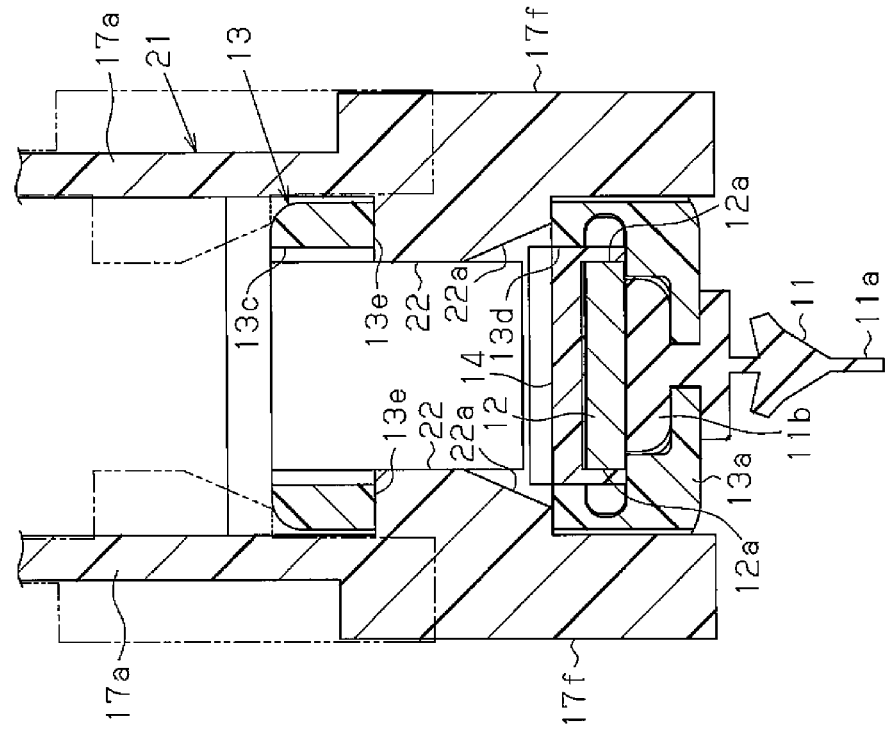

WIPER BLADE AND WIPER FOR VEHICLE

BACKGROUND OF THE INVENTION

The present invention relates to a wiper blade and a wiper for a vehicle.

A known wiper blade in the prior art is formed to have a decreased height by coupling a wiper strip (rubber blade) to a support frame that combines leaf spring backings (flat main rods), which are made of a resilient material, without using a lever assembly that couples a plurality of levers in a direction intersecting a wiped surface (refer to, for example, Japanese National Phase Laid-Open Patent Publication No. 2007-531663).

In the above-described wiper blade, the support frame, which holds the backing and a base portion of the wiper strip, is formed by a single member that extends over the entire length of the wiper blade in its longitudinal direction. Thus, a coupling member coupled to a wiper arm is further stacked on and fixed to the support frame. This increases the height of the wiper blade.

SUMMARY OF THE INVENTION

It is an object of the present invention to provide a wiper blade and a wiper for a vehicle having a sufficiently decreased height and an aesthetic design.

To achieve the above object, one aspect of the present invention is a wiper blade including an elongated wiper strip, a leaf spring backing, a blade holder directly or indirectly coupled to a wiper arm, and two cases opposed to each other and arranged at two longitudinal ends of the blade holder. The wiper strip includes a base portion and a wiping portion, which wipes a wiped surface. The backing extends along a longitudinal direction of the wiper strip and provides the wiper strip with rigidity and resilience. The blade holder is coupled to the backing to restrict movement of the backing in the longitudinal direction. The blade holder includes a blade holding portion that surrounds a base portion of the wiper strip and the backing at a longitudinally central portion of the wiper strip and the backing. The blade holding portion holds the wiper strip and the backing to restrict movement of the wiper strip and the backing in a direction orthogonal to the longitudinal direction. Each of the cases includes a case holding portion surrounding the base portion of the wiper strip and the backing. The case holding portion holds the wiper strip and the backing to restrict movement of the wiper strip and the backing in the direction orthogonal to the longitudinal direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 14A is a partial cross-sectional view showing a how coupling is performed in a further example; and FIG. 14B is a partial cross-sectional view showing a vehicle wiper in a further example.

DETAILED DESCRIPTION OF THE INVENTION

One embodiment of the present invention will now be described with reference to FIGS. 1 to 11.

Figure 1:
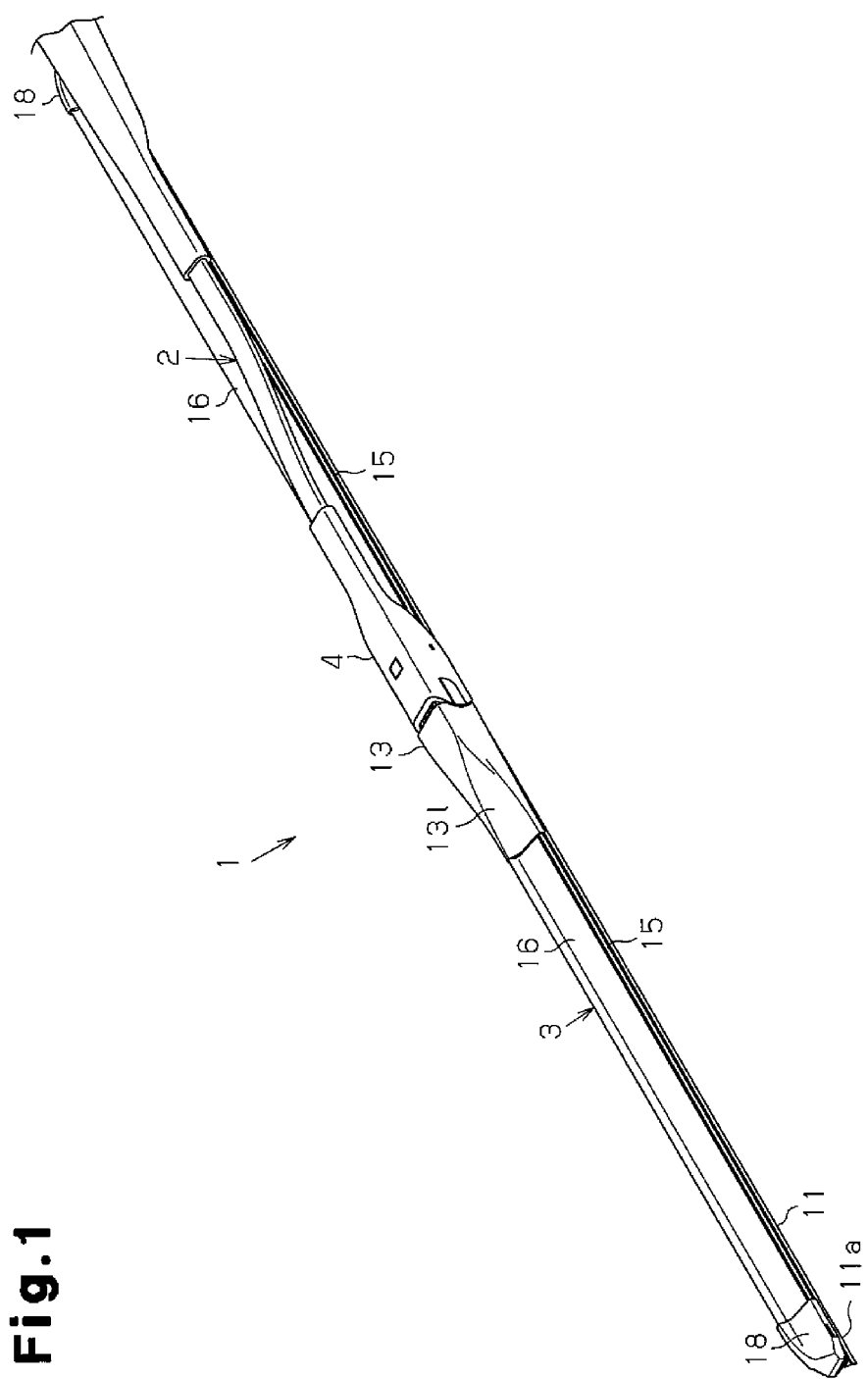
FIG. 1 is a perspective view showing a wiper for a vehicle according to one embodiment of the present invention.

Referring to FIG. 1, a wiper 1 for a vehicle wipes off raindrops from a windshield, which serves as a wiped surface of the vehicle. The wiper 1 includes a wiper arm 2 and a wiper blade 3, which is coupled to the wiper arm 2. The wiper arm 2 includes a basal end fixed to a pivot shaft (not shown), which is rotated back and forth by predetermined angles by the driving force of a wiper motor (not shown). As the pivot shaft rotates back and forth, the wiper arm 2 swings back and forth. A distal coupling portion 4 of the wiper arm 2 is biased toward the windshield (wiped surface) by a biasing mechanism (not shown). The wiper blade 3 is coupled to the distal coupling portion 4.

Figure 2:
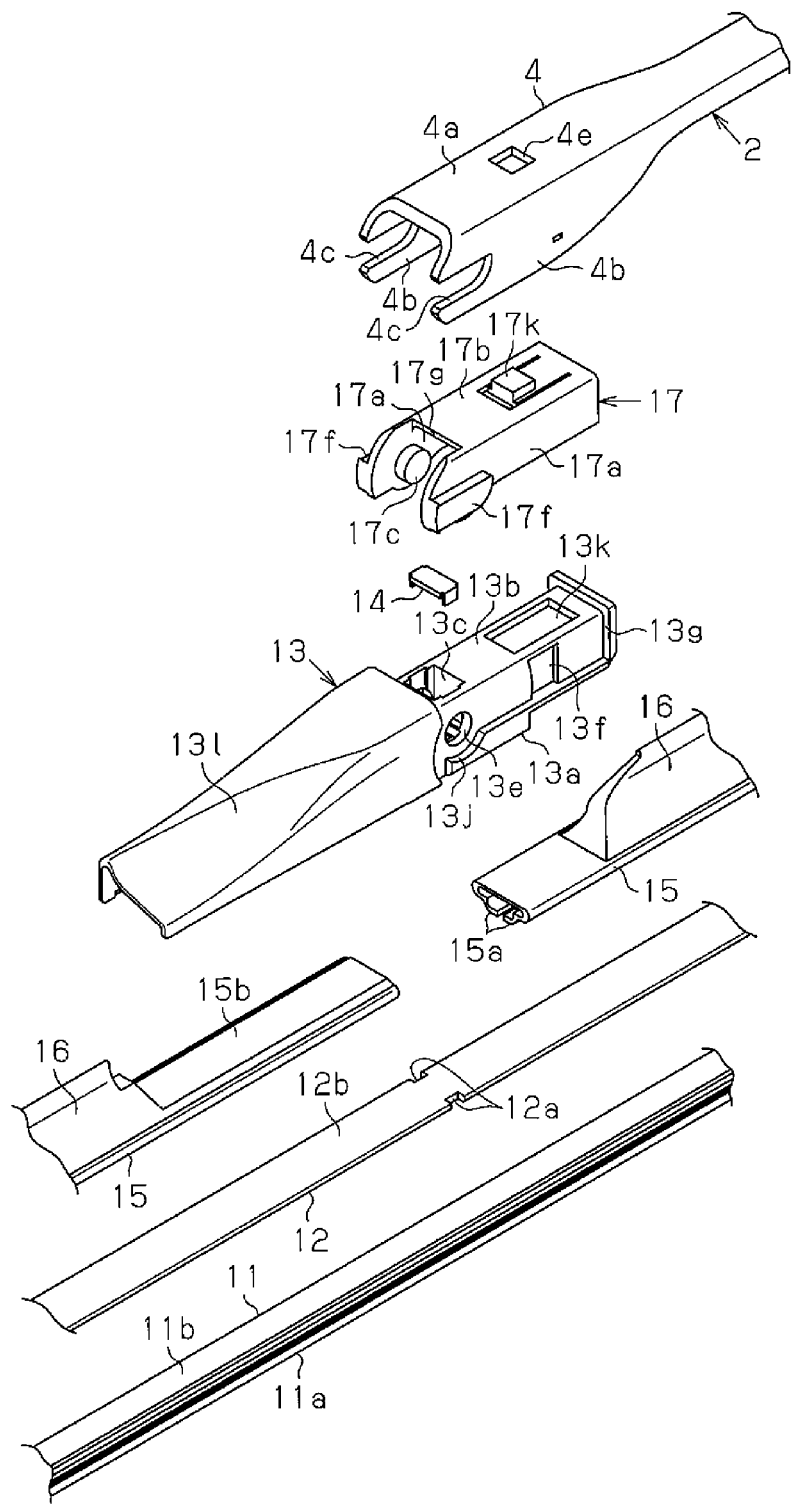
FIG. 2 is a partially exploded perspective view showing the wiper of FIG. 1.
Figure 3:
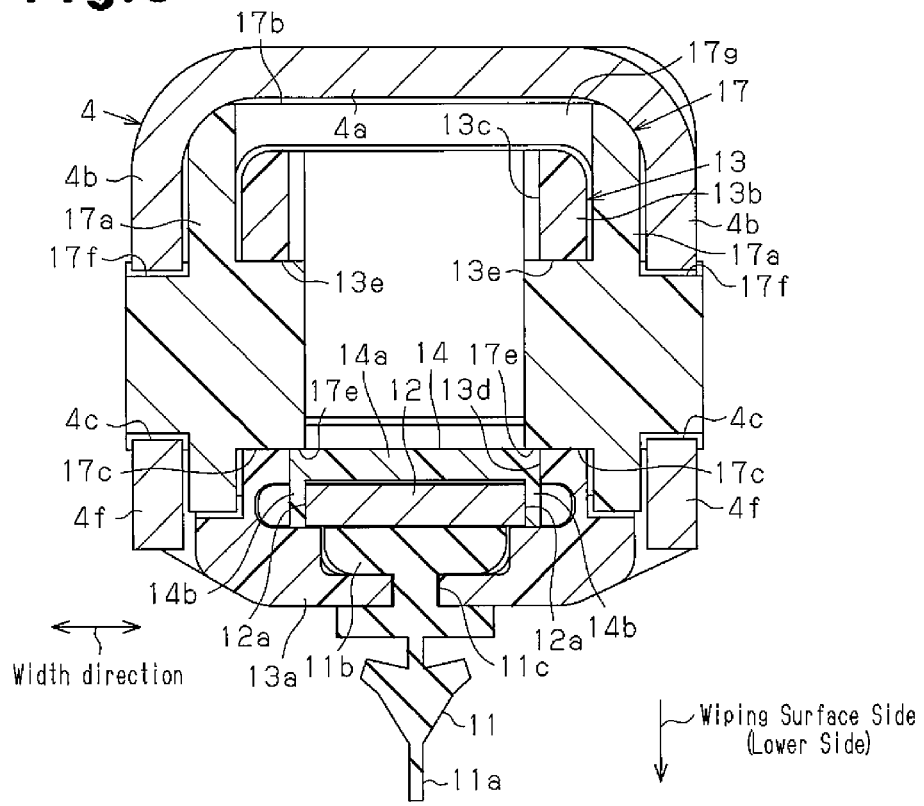
FIG. 3 is a partial sectional view showing the wiper of FIG. 1.
Figure 4:
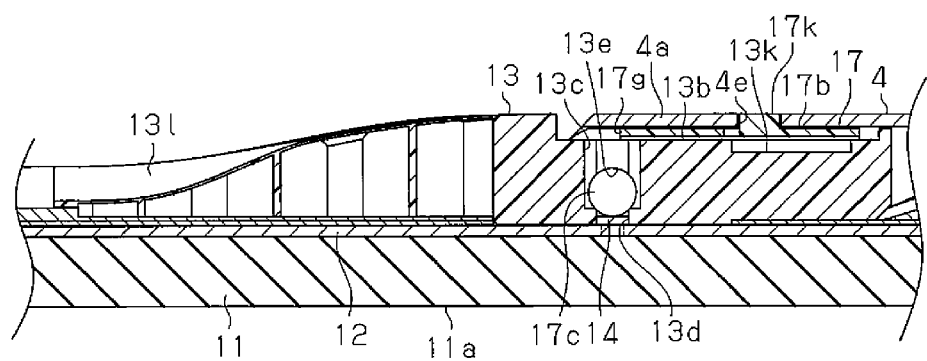
FIG. 4 is a partial sectional view showing the wiper of FIG. 1.

As shown in FIGS. 2 to 4, the wiper blade 3 includes an elongated wiper strip 11 (rubber blade), which includes a wiping portion 11a for wiping the wiped surface (windshield), and a leaf spring backing 12, which extends along a longitudinal direction of the wiper strip 11 and provides the wiper strip 11 with rigidity and resiliency. The backing 12 plastically deforms to extend along the wiped surface. As shown in FIG. 3, the wiper strip 11 of the present embodiment includes a base portion 11b and a narrow portion 11c in addition to the wiping portion 11a. The base portion 11b has a substantially rectangular cross-section in a direction orthogonal to the longitudinal direction. The narrow portion 11c extends downward from a laterally central part of the base portion 11b. The wiping portion 11a extends further downward from the narrow portion 11c. In the description hereafter, the terms "longitudinal direction" and "lateral direction" respectively refer to the longitudinal direction and lateral direction of the wiper blade 3 unless otherwise specified. As shown in FIGS. 2 and 3, in the present embodiment, the wiper blade 3 includes only one backing 12, and backing engaging portions 12a are formed in a longitudinally central part of the backing 12. The backing engaging portions 12a are formed by cutting out each of the two lateral sides of the backing 12 toward the laterally central part of the backing 12.

As shown in FIG. 3, the wiper blade 3 further includes a blade holder 13 (coupling lever) having blade holding portions 13a (lever holding portion). The blade holding portions 13a encompass the base portion 11b of the wiper strip 11 and the backing 12 at the longitudinally central parts of the wiper strip 11 and the backing 12. The blade holding portions 13a hold and restrict movement the wiper strip 11 and the backing 12 in a direction orthogonal to the longitudinal direction.

More specifically, the blade holder 13 is made of a hard resin material, such as polyethylene terephthalate or polybutylene terephthalate. As shown in FIGS. 2 to 5B, the blade holder 13 includes a generally box-shaped lever main body 13b and the blade holding portions 13a. As shown in FIGS. 3 and 5B, the blade holding portions 13a, which are arm-shaped, extend downward from the two lateral sides of a lower end surface of the lever main body 13b and further extend inward in the lateral direction. As shown in FIG. 3, the blade holding portions 13a of the present embodiment encompass the base portion 11b and the backing 12 in a state in which the backing 12 is in contact with (arranged on) an upper end surface of the base portion 11b of the wiper strip 11.

As shown in FIGS. 2 to 4 and 5A, a vertical passage 13c extends through the lever main body 13b in the vicinity of a first longitudinal end of the lever main body 13b. The vertical passage 13c extends downward through the blade holding portion 13a so that the vertical passage 13c is in communication with the blade holding portion 13a. The vertical passage 13c is generally tetragonal as viewed from above. As shown in FIG. 4, the vertical passage 13c includes a lower end portion that is reduced in size in the longitudinal direction. The lower end portion of the vertical passage 13c functions as a support part accommodation portion 13d that accommodates a support part 14 (see FIG. 2), which functions as a movement restriction member as will be described later.

As shown in FIGS. 2 to 5B, shaft insertion holes 13e are formed in the vicinity of the first longitudinal end of the lever main body 13b (positions corresponding to vertical passage 13c). The shaft insertion holes 13e extend through the lateral side walls of the lever main body 13b and communicate the exterior with the vertical passage 13c (support part accommodation portion 13d). Thus, the shaft insertion holes 13e extend in the lateral direction from the inner side surfaces of the vertical passage 13c to the exterior.

Figure 5A:
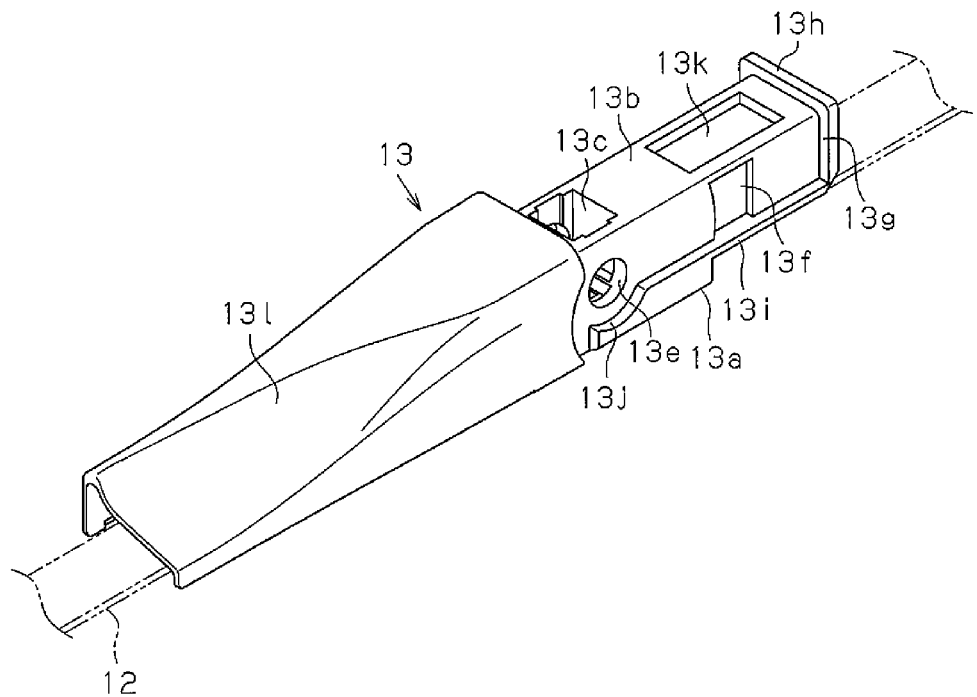
FIGS. 5A and 5B are perspective views of a blade holder shown in FIG. 1.
Figure 5B:
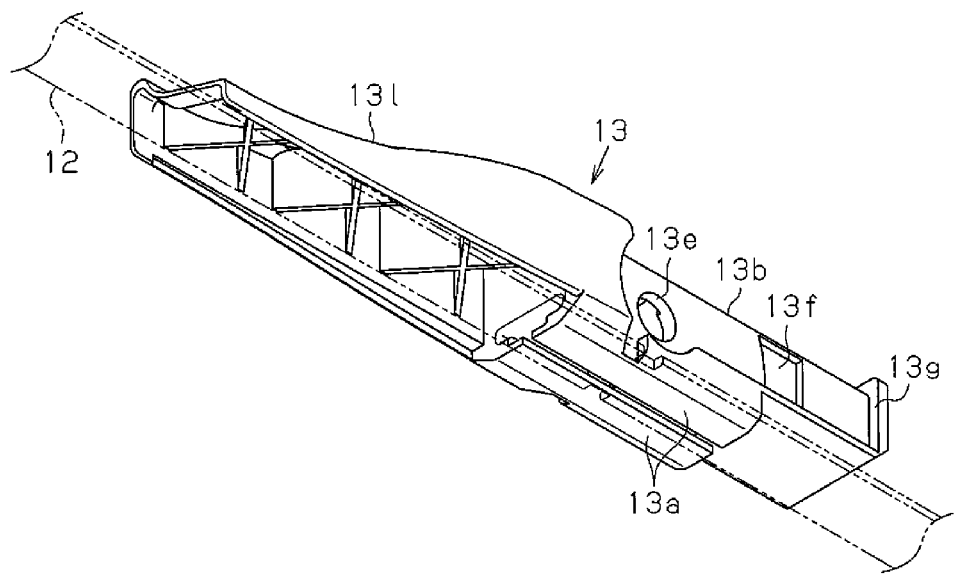

As shown in FIGS. 2, 5A and 5B, guide grooves 13f are formed in the generally middle part of the two side walls of the lever main body 13b. Each guide groove 13f extends in the vertical direction along an arc that is concentric with a shaft center of the shaft insertion hole 13e.

As shown in FIGS. 5A and 5B, retaining wall portions 13g extend vertically from the two side surfaces of the lever main body 13b at a second longitudinal end. As shown in FIG. 5A, an upper wall portion 13h extends from an upper surface of the lever main body 13b at the second longitudinal end. The upper wall portion 13h extends in the lateral direction to connect upper ends of the retaining wall portion 13g.

As shown in FIG. 5A, lower wall portions 13i extends from the two side surfaces at the lower end of the lever main body 13b. Each lower wall portion 13i extends from the lower end of the corresponding retaining wall portion 13g to a location in the vicinity of a first longitudinal end of the lever main body 13b. As shown in FIG. 5A, opposing surfaces 13j are formed in the first longitudinal ends of the lower wall portions 13i. Each of the opposing surfaces 13j is arced and coaxial with the axis of the insertion holes 13e.

As shown in FIGS. 4 and 5A, a play groove 13k is formed in a generally central part of an upper surface of the lever main body 13b.

Figure 9:
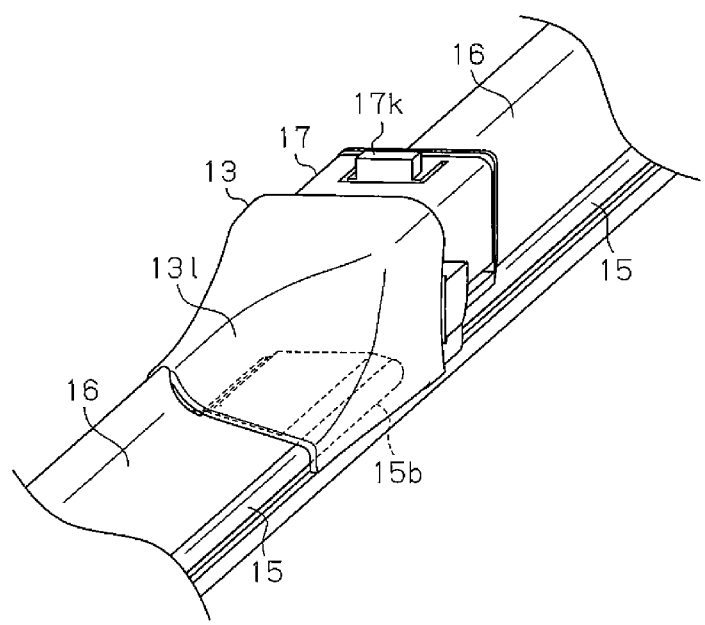
FIG. 9 is a perspective view showing a wiper blade of FIG. 8.

As shown in FIGS. 1, 2 and 9, a curved coupling portion 13l is formed in the blade holder 13. The curved coupling portion 13l extend from the vicinity of the first longitudinal end of the lever main body 13b to the first longitudinal end of the blade holder 13, and the curved coupling portion 13l is smoothly coupled to a fin portion 16 of a case 15, which will be described later.

The blade holder 13 is coupled to the backing 12 in a state in which movement of the blade holder 13 in the longitudinal direction with the backing 12 is restricted. More specifically, the backing 12 is inserted into the blade holding portions 13a of the blade holder 13 along the longitudinal direction. Then, the blade holder 13 and the backing 12 are positioned in the longitudinal direction so that the support part accommodation portion 13d (see FIGS. 3 and 4) and the backing engaging portion 12a (see FIG. 2) are aligned with each other. The support part 14 is inserted into the vertical passage 13c from above and fitted (dropped) into the support part accommodation portion 13d. The support part 14 is engaged with the backing 12 (backing engaging portion 12a) and the blade holder 13 (support part accommodation portion 13d). This restricts movement of the blade holder 13 and the backing 12 in the longitudinal direction and positions the blade holder 13 and the backing 12 in the longitudinal direction. As shown in FIG. 3, the support part 14 of the present embodiment includes a central portion 14a, which extends in the lateral direction, and two arm portions 14b, which extend downward from the two opposite ends of the central portion 14a. The central portion 14a is held in the support part accommodation portion 13d and engaged with the support part accommodation portion 13d, and the arm portions 14b are respectively engaged with the backing engaging portions 12a.

A clip 17 (see FIG. 2), which serves as a coupling member, is coupled to the wiper arm 2. The clip 17 is coupled to the blade holder 13 pivotally about the axis of the shaft insertion holes 13e that is orthogonal to the two side surfaces of the blade holder 13.

As shown in FIG. 2, the clip 17 includes two sidewalls 17a and an upper wall 17b. The sidewalls 17a extend from positions corresponding to the axis of the shaft insertion holes 13e to the second longitudinal end along the two side surfaces of the lever main body 13b. The upper wall 17b connects the two sidewalls 17a and extends along the upper surface of the lever main body 13b.

As shown in FIGS. 2 and 3, support shafts 17c are formed on inner surfaces of the two sidewalls 17a of the clip 17. The support shafts 17c are inserted into the shaft insertion holes 13e to pivotally support the clip 17. As shown in FIG. 3, the support shafts 17c have such lengths that are set so that the support shafts 17c project into the vertical passage 13c.

The support shaft 17c includes a distal portion that functions stopper as a separation restriction portion 17e that abuts against an upper surface of the support part 14 fitted into the support part accommodation portion 13d to restrict separation of the support part 14 in the upward direction. In this embodiment, each of the shaft insertion holes 13e and the support shafts 17c functions as a portion of the pivotal coupling portion, and the shaft insertion holes 13e and the support shafts 17c form the pivotal coupling portion.

As shown in FIGS. 2 and 6 to 8, engagement projections 17f are formed on outer surfaces of the two sidewalls 17a of the clip 17. The engagement projections 17f are formed at the first longitudinal ends of the sidewalls 17a at the rear sides of the support shafts 17c. The engagement projections 17f are formed at vertically central portions of the sidewalls 17a. The engagement projections 17f have upper and lower end surfaces that substantially extend in a direction from the first longitudinal ends of the sidewalls 17a toward the second ends. A curved surface is formed in the vicinity of the second longitudinal end of the lower end surface. The curved surface is curved upward so as to become higher as the first end becomes farther.

Figure 6:
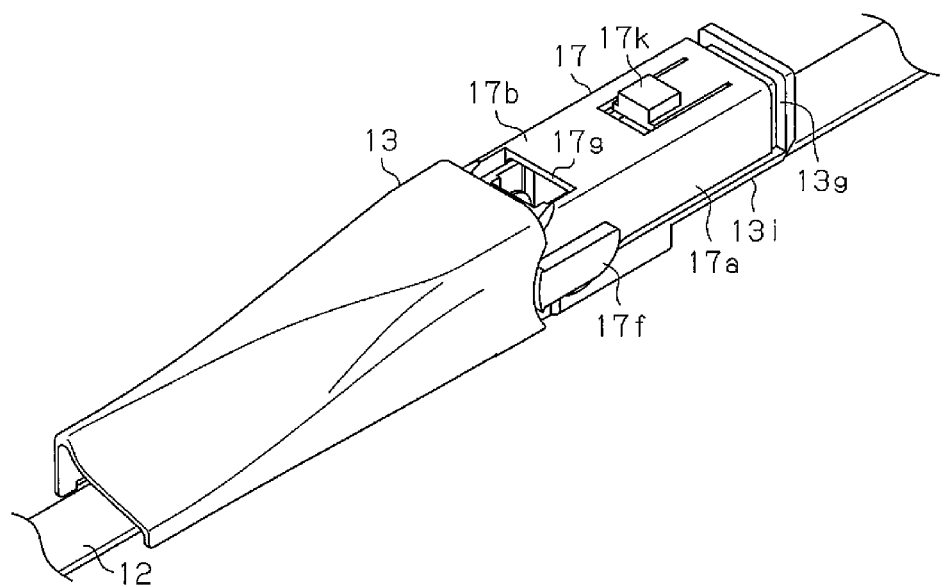
FIG. 6 is a perspective view showing a backing, a blade holder, and a clip of FIG. 2 in a coupled state.

As shown in FIG. 6, a notch 17g is formed in the upper wall 17b in the end of the upper wall 17b in the vicinity of he end near the axis, that is, in the vicinity of the first longitudinal end near the support shaft 17c. The notch 17g allows for pivoting of the clip 17. The two sidewalls 17a of the clip 17 extend toward the first longitudinal end slightly further from the support shaft 17c as shown in FIG. 2. Thus, if the upper wall 17b were to extend to a position corresponding to the first longitudinal end of the sidewalls 17a, the upper wall 17b would strike the upper surface of the lever main body 13b when the clip 17 pivots. In this embodiment, however, the notch 17g is formed in the upper wall 17b. This allows the clip 17 to pivot without the need to form a recess in the upper surface of the lever main body 13b.

Figure 7:
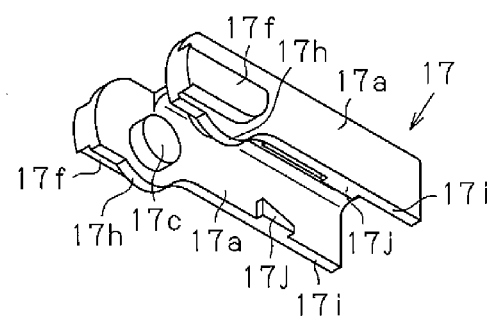
FIG. 7 is a perspective view showing the clip of FIG. 2.
Figure 8:
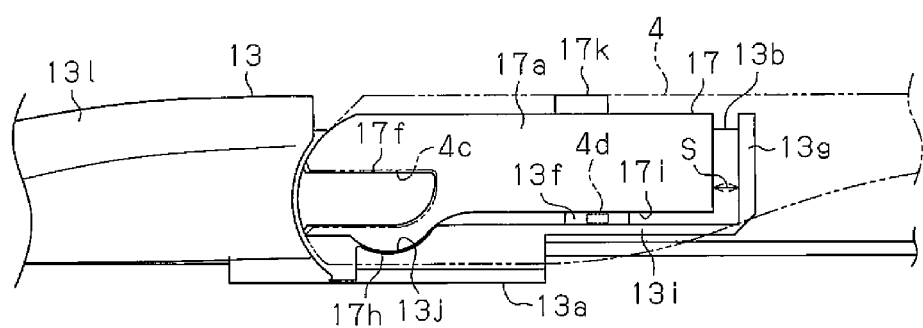
FIG. 8 is a side view showing the backing, the blade holder and the clip of FIG. 2 in a coupled state.

As shown in FIGS. 7 and 8, arc surfaces 17h, which extend about the axes of the support shafts 17c and shaft insertion holes 13e, are formed on the lower end surfaces of the two sidewalls 17a of the clip 17. As shown in FIG. 8, the arc surfaces 17h are opposed to the opposing surfaces 13j of the blade holder 13. The arc surfaces 17h of the present embodiment are opposed to the opposing surfaces 13j to form slight gaps therebetween in an initial state (state immediately after coupling). When wear occurs at the pivotal coupling portion (shaft insertion holes 13e and the support shafts 17c), the arc surfaces 17h move in contact with the opposing surfaces 13j.

As shown in FIGS. 7 and 8, the lower end surfaces of the sidewalls 17a of the clip 17 extending from the axis of the clip 17 (support shafts 17c) toward the second longitudinal end define upper lower end surfaces 17i, which are higher than the lower parts of the arc surfaces 17h. In this manner, in the lower end surfaces of the two sidewalls 17a of the clip 17 in the present embodiment, the arc surfaces 17h are formed only below the axes of the support shafts 17c and extend from the upper lower end surfaces 17i in an arcuate form.

As shown in FIG. 8, in a state in which the clip 17 is coupled to the blade holder 13, a vertically extending gap S is formed between the retaining wall portion 13g and the second longitudinal ends of the two sidewalls 17a.

As shown in FIG. 7, guide projections 17j, which are fitted to the guide grooves 13f, are formed on inner side surfaces of the two the sidewalls 17a of the clip 17 (see FIG. 5). In a state in which the guide projections 17j are fitted to the guide grooves 13f (usage state after coupling), the guide projections 17j are guided by the guide grooves 13f. Further, the guide projections 17j restrict pivoting of the clip 17 relative to the blade holder 13 from terminal end positions of the guide grooves 13f in the vertical direction.

As shown in FIGS. 2, 4 and 6, a resilient projection 17k, which is flexible, extends upward in the vertical direction, is formed on the upper wall 17b of the clip 17. The resilient projection 17k is formed at a position corresponding to the play groove 13k (see FIGS. 4 and 5A) of the blade holder 13. The play groove 13k allows the resilient projection 17k to bend downward in a state in which the resilient projection 17k is coupled (see FIGS. 4 and 6).

As shown in FIGS. 1 and 2, the wiper blade 3 includes two cases 15 that are arranged at the two longitudinal ends of the blade holder 13 (blade holding portion 13a). The cases each include case holding portions 15a (see FIG. 2) that surround the base portion 11b of the wiper strip 11 and the backing 12. The case holding portions 15a hold the wiper strip 11 and the backing 12 to restrict movement of the wiper strip 11 and the backing 12 in a direction orthogonal to the longitudinal direction.

Each of the cases 15 is made of soft resin material (resin material having flexibility) such as polypropylene. The case 15 has a lower rigidity than that of the blade holder 13, more specifically, the blade holding portion 13a. The case holding portions 15a have the same shape as the blade holding portions 13a. Thus, the blade holding portions 13a and the case holding portions 15a are continuous in the longitudinal direction in a coupled state and entirely surround (accommodate) the base portion 11b of the wiper strip 11 and the backing 12 in the longitudinal direction.

The fin portion 16, which is made of a rubber material or elastomer material, is arranged on an upper surface of each case 15. The case 15 and the fin portion 16 are formed integrally through two-color molding. The fin portion 16 converts a traveling air stream into pressing force that acts on the wiped surface. More specifically, the fin portion 16 is curved so that when the wiper blade 3 is located at a stop position, the height of the fin portion 16 from the wiped surface increases toward the rear of the vehicle. As shown in FIGS. 2 and 9, the curved coupling portion 13l of the blade holder 13 is gradually curved from the generally box-shaped lever main body 13b toward the fin portion 16. The rigidity of the fin portion 16 is lower than the case 15.

In the present embodiment, coupling portions between the curved coupling portion 13l, the corresponding case 15 (including fin portion 16), and the blade holder 13 (curved coupling portion 13l) are set such that their upper end surfaces are flush with one another. In other words, the coupling portions of the curved coupling portion 13l are shaped continuously with the corresponding case 15 and blade holder 13. As shown in FIGS. 2 and 9, a step portion 15b is formed on the case 15 in correspondence with the curved coupling portion 13l. The step portion 15b extends in the longitudinal direction so that its upper surface is covered by the blade holder 13 (curved coupling portion 13l).

As shown in FIG. 1, the wiper blade 3 includes caps 18, which are fixed to the two longitudinal ends of the backing 12. Each cap 18 covers a longitudinal end of the backing 12, a longitudinal end of the case 15 (including fin portion 16), and a longitudinal end of the base portion 11b of the wiper strip 11.

The clip 17 of the wiper blade 3 is coupled and fixed to the distal coupling portion 4 of the wiper arm 2.

Figure 10:
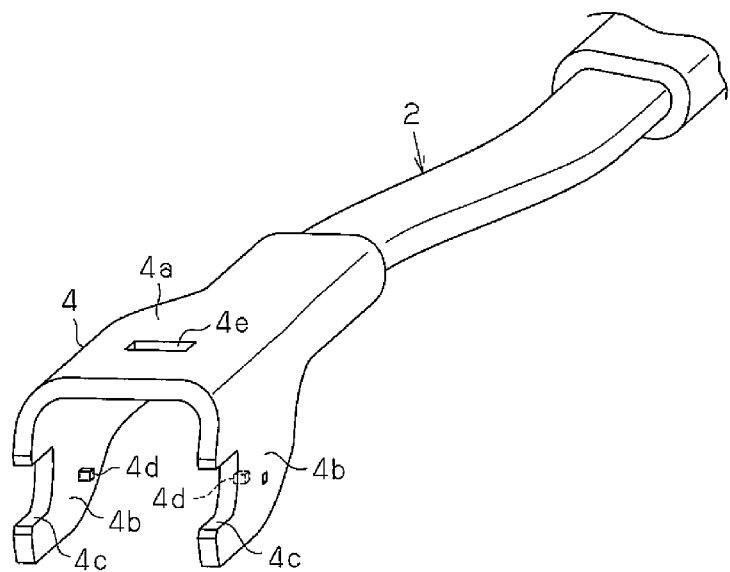
FIG. 10 is a perspective view showing a wiper arm of FIG. 2.

As shown in FIGS. 2 and 10, the distal coupling portion 4 of the wiper arm 2 includes an upper covering wall 4a, which substantially covers an upper surface (upper wall 17b) of the clip 17, and two side covering walls 4b, which substantially cover outer side surfaces (the two sidewalls 17a) of the clip 17. As shown in FIG. 2, an engagement recess 4c is formed in each side covering wall 4b. When the distal coupling portion 4 is coupled to the clip 17 along the longitudinal direction, the engagement recesses 4c are engaged with the engagement projections 17f of the clip 17 in the vertical direction. Each engagement recess 4c is located at a vertically central portion of the corresponding side covering wall 4b and formed in so that a longitudinal distal end (first longitudinal end) of the engagement recess 4c is open. When the engagement projection 17f is inserted from the opening into the engagement recess 4c in the longitudinal direction (from the state shown in FIG. 11 to the state shown in FIG. 8) and coupled to the engagement recess 4c, the engagement projection 17f and the engagement recess 4c are engaged with each other in the vertical direction.

Figure 11:
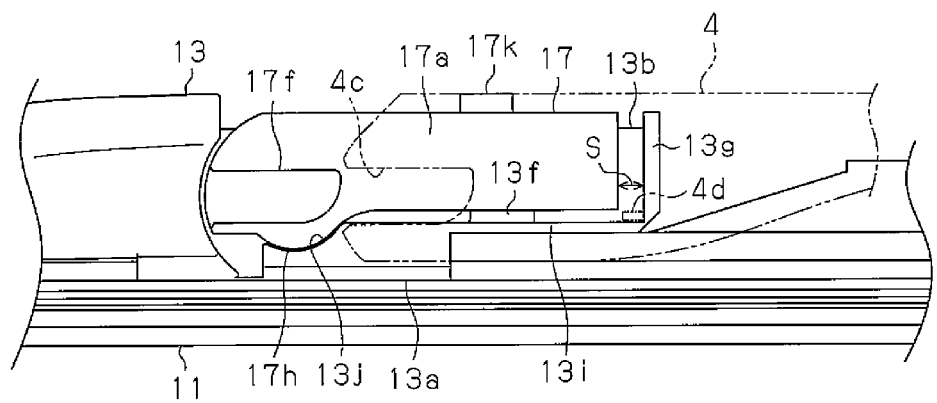
FIG. 11 is a side view showing the vehicle wiper of FIG. 1.

As shown in FIG. 10, punching is performed to form projections 4d, which serve as retaining portions, on inner side surfaces of the two side covering walls 4b of the distal coupling portion 4. The projections 4d project toward a laterally central part. As shown in FIG. 11, the projections 4d abut against the retaining wall portion 13g of the blade holder 13 in the longitudinal direction (state shown by double-dashed line) when the distal coupling portion 4 is located at a longitudinal position at which the engagement recesses 4c are not engaged with the engagement projections 17f. That is, when the distal coupling portion 4 is moved in the longitudinal direction relative to the clip 17 (see FIG. 11) from a state (see FIG. 8) in which the distal coupling portion 4 is coupled to the clip 17, the projections 4d abut against the retaining wall portion 13g to restrict further relative movement (separation) in the longitudinal direction. In a state in which the projections 4d abut against the retaining wall portion 13g in the longitudinal direction (see FIG. 11), movement in the vertical direction is allowed by the gap S extending along the vertical direction between the retaining wall portion 13g and the second longitudinal ends of the sidewalls 17a of the clip 17.

As a result, to assemble the wiper 1, the distal coupling portion 4 is first moved downward relative to the clip 17. Then, the distal coupling portion 4 is relatively moved in the longitudinal direction in a state in which the engagement recesses 4c are engaged with the engagement projection 17f. For removal, the distal coupling portion 4 is first moved in the longitudinal direction relative to the clip 17 to remove the engagement recesses 4c from the engagement projection 17f. Then, the distal coupling portion 4 is relatively moved upward and removed.

As shown in FIG. 8, the projections 4d are formed at positions where the projections 4d abut against the upper lower end surface 17i of the clip 17 in a state in which the distal coupling portion 4 is coupled to the clip 17.

The projections 4d are formed at positions where they abut against lower ends of the guide projections 17j (see FIG. 7), and the projections 4d abut against lower terminal ends of the guide grooves 13f (see FIG. 5). The projections 4d restrict the pivoting of the clip 17 or the distal coupling portion 4 relative to the blade holder 13. That is, in a state in which the distal coupling portion 4 is coupled to the clip 17, the projections 4d are integrally engaged with the guide projections 17j. This increases the rigidity of the projections 4d and the guide projections 17j and restricts the pivoting of the clip 17 or the distal coupling portion 4.

As shown in FIGS. 2, 4 and 10, a fitted hole 4e, which serves as a fitted portion, is formed in the upper covering wall 4a of the distal coupling portion 4. The resilient projection 17k is fitted into the fitted hole 4e in a state in which the distal coupling portion 4 is coupled to the clip 17 (see FIG. 8) and the resilient projection 17k is not bent downward. Hence, the resilient projection 17k is engaged with the fitted hole 4e in the longitudinal direction. In this structure, if any external force is not applied to the resilient projection 17k, relative movement of the distal coupling portion 4 and the clip 17 in the longitudinal direction is prevented.

As shown in FIG. 3, lap portions 4f are formed in the side covering walls 4b of the distal coupling portion 4. The lap portions 4f extend downward in the vertical direction to positions corresponding to the backing 12.

The operation of the vehicle wiper 1 will now be described.

In the vehicle wiper 1, the wiper blade 3 (excluding the clip 17) is pivotal relative to the wiper arm 2 and the clip 17, which is fixed to the distal coupling portion 4 of the wiper arm. When the distal coupling portion 4 of the wiper arm 2 is biased toward the windshield (wiped surface) by the biasing mechanism (not shown), the biasing force is transmitted to the wiper strip 11 through the clip 17, the blade holder 13 and the backing 12. As a result, the wiping portion 11a of the wiper strip 11 is pressed against the windshield (wiped surface) over its entire length in the longitudinal direction. When the vehicle is traveling, the fin portion 16 converts a traveling air stream into a pressing force that acts toward the windshield (wiped surface), and the wiping portion 11a of the wiper strip 11 is pressed against the windshield (wiped surface). Accordingly, when the wiper arm 2 is pivoted back and forth about its pivot axis, satisfactory wiping is performed.

The advantages of the above embodiment will now be described.

(1) The blade holding portion 13a and the case holding portion 15a hold the wiper strip 11 and backing 12 in the longitudinal direction to entirely restrict movement of the wiper strip 11 and backing 12 in a direction orthogonal to the longitudinal direction. The blade holder 13, which is directly coupled to the wiper arm 2 or indirectly coupled by the clip 17 to the wiper arm 2, is coupled to restrict movement of the blade holder 13 in the longitudinal direction relative to the backing 12. Therefore, the backing 12 is not displaced relative to the blade holder 13 in the longitudinal direction. Further, the blade holding portion 13a of the blade holder 13 is arranged between the case holding portions 15a of the two cases 15 so that the blade holding portion 13a is located on an upper surface 12b of the backing 12. Hence, as compared with a structure in which a single case corresponds to the entire length of the backing 12 and a blade holder holds a longitudinally central portion of the case, the overlapped amount of components in the wiper blade 3 in the vertical direction can be reduced. As a result, the height from the wiped surface can be sufficiently reduced, and the wiper blade 3 may be slim and low thereby having an aesthetic design.

(2) When the wiper 1 is operated, the wiper arm 2 first moves. That is, the blade holder 13 to which the wiper arm 2 is coupled first moves. In this state, when a friction force between the wiped surface and the wiper strip 11 is large or when the wiper strip 11 is frozen and stuck to the wiped surface in a cold region, the wiper strip 11 (more specifically, wiping portion 11a) is pulled. Hence, the base portion of the wiper strip 11, which is made of a rubber material or the like, is deformed and pulled out from the blade holding portions 13a of the blade holder 13, which surrounds and holds the backing 12 and the base portion of the wiper strip 11. In addition, when the rigidity of the blade holding portion 13a is low, the blade holding portion 13a is deformed and the wiper strip 11 is easily pulled out. In the present embodiment, however, at least the blade holding portion 13a has a higher rigidity than the case 15, which is formed in conformance with the wiped surface. This prevents separation of the wiper strip 11 from the blade holding portion 13a.

(3) The cases 15 are arranged in an immovable state in the longitudinal direction relative to the backing 12 due to the caps 18 and the blade holder 13. The cases 15 are not fixed to the backing 12. The cases 15 are arranged between the blade holder 13 and the caps 18. Hence, the wiper blade 3 can easily be coupled. Further, the cross-sectional shape of the case 15 is uniform in the longitudinal direction. Thus, the case 15 can easily be manufactured.

(4) The notch 17g allowing for pivoting of the clip 17 is formed in the end of the upper wall 17b of the clip 17 near the axis (end close to the support shafts 17c). Hence, the height of the upper wall 17b from the wiped surface can be kept low, and the clip 17 is allowed to rotate without forming a recess in the upper surface of the lever main body 13b to allow for pivoting of the clip 17. Since a recess does not have to be formed in the upper surface of the lever main body 13*b* to allow for the clip 17 to pivot, high rigidity can be maintained for the lever main body 13*b* (blade holder 13).

(5) The pivotal coupling portions (shaft insertion holes 13*e* and support shafts 17*c*) that pivotally couple the blade holder 13 and the clip 17 to each other are arranged at the pivoting axis position in each of the two side surfaces of the lever main body 13*b* of the blade holder 13 and two sidewalls 17*a* of the clip 17. In this structure, the clip 17 is pivotal relative to the blade holder 13. The arc surfaces 17*h*, which are coaxial with the pivot axis, are formed on the lower end surfaces of the sidewalls 17*a* of the clip 17, and the opposing surfaces 13*j*, which are opposed to the arc surfaces 17*h*, are formed on the blade holder 13. Thus, a portion that pivotally supports the clip 17 can be added to a portion other than the pivotal coupling portion (shaft insertion holes 13*e* and support shafts 17*c*). The clip 17 always receives a force (pressing force) acting downward (toward the wiped surface) from the wiper arm 2. However, by receiving the arc surfaces 17*h* at the lower ends of the two sidewalls 17*a* with the opposing surfaces 13*j* of the blade holder 13, the durability can be improved in the pivotal coupling portion (shaft insertion holes 13*e* and support shafts 17*c*). In the present embodiment, in the initial state (state immediately after members are coupled), the arc surfaces 17*h* are set to be opposed to the opposing surfaces 13*j* with slight gaps formed therebetween. Thus, the coupling properties are improved without the need for high dimensional accuracy, and the pivotal coupling portion (shaft insertion holes 13*e* and support shafts 17*c*) allows for smooth pivoting. When a slight wear occurs in the pivotal coupling portion (shaft insertion holes 13*e* and support shafts 17*c*), the arc surfaces 17*h* and the blade holder 13 move in contact with each other. This suppresses further wear of the pivotal coupling portion (shaft insertion holes 13*e* and support shafts 17*c*).

(6) The curved coupling portion 13*l* coupled to the fin portions 16 of the cases 15 is formed on the blade holder 13. Hence, the cases 15 and the blade holder 13 are coupled to each other with a smooth shape that does not include any sudden steps, and the aesthetic appeal of the wiper can be improved. Since sudden steps are suppressed, the traveling air stream can be rectified in a preferable manner.

(7) The coupling portions between the cases 15 (including fin portions 16) and the blade holder 13 (curved coupling portion 13*l*) are set so that their upper end surfaces are flush with each other. This improves the appearance of the wiper. Further, the step portion 15*b* extending in the longitudinal direction is formed on the case 15 (including fin portion 16) so that the upper surface of the case 15 can be covered by the blade holder 13 (curved coupling portion 13*l*). Thus, the step portion 15*b* reduces the entry of foreign matter (snow, dry leaves, or the like) into the case 15 from the coupling portions of the upper end surfaces.

(8) The blade holding portion 13*a* and the case holding portion 15*a* surround and hold the base portion 11*b* and the backing 12 in a state in which the backing 12 abuts against the upper end surface of the base portion 11*b* of the wiper strip 11. That is, the blade holding portion 13*a* and the case holding portion 15*a* do not have walls between the wiper strip 11 and the backing 12. As compared with a structure having such a wall, the height of the wiper blade 3 from the wiped surface can be further reduced.

(9) The distal coupling portion 4 of the wiper arm 2 includes the lap portions 4*f* extending downward in the vertical direction to positions corresponding to the backing 12. Hence, even if a force acts to twist and deform the blade holding portion 13*a* together with the backing 12 at the portion of the wiper 1 where the lap portions 4*f* is arranged, the lap portions 4*f* suppresses deformation of the blade holding portion 13*a*.

(10) The wiper blade 3 is coupled in engagement with the backing 12 and the blade holder 13 in the longitudinal direction, and the wiper blade 3 includes the support part 14 that restricts relative movements of the backing 12 and the blade holder 13 in the longitudinal direction. Thus, by coupling the support part 14 after aligning the backing 12 and the blade holder 13, their relative positions in the longitudinal direction can be fixed. In a structure in which the resilient engaging portion is integrally formed with the blade holder to restrict movement of the blade holder relative to the backing in the longitudinal direction, the resilient engaging portion may be caught in the wiper strip when the wiper strip and the blade holder are coupled to each other. In the wiper blade 3 of the present embodiment, the resilient engaging portion is prevented from being caught. Hence, the wiper blade 3 has satisfactory coupling properties and can suppress damages (breakage or wear) during coupling.

(11) The clip 17 includes the separation restriction portion 17*e* (distal portion of the support shaft 17*c*) to restrict upward separation of the support part 14. Thus, when the clip 17 is coupled to the blade holder 13, this automatically prevents the support part 14 from being upwardly separated.

(12) The separation restriction portion 17*e* is the support shaft 17*c* (its distal portion) that is inserted into the shaft insertion hole 13*e* of the blade holder 13 and pivotally supports the clip 17. Since the support shaft 17*c* implements two functions, the shape of the clip 17 can be prevented from becoming complicated, for example.

(13) The engagement projections 17*f* are formed on the outer side surfaces of the two sidewalls 17*a* of the clip 17. The engagement recesses 4*c*, which engage with the engagement projections 17*f* in the vertical direction by coupling the engagement recesses 4*c* and the clip 17 along the longitudinal direction, are formed in the two side covering walls 4*b* of the distal coupling portion 4 in the wiper arm 2. This restricts movement of the wiper arm 2 in the vertical direction relative to the clip 17. For example, when the wiper arm (distal coupling portion) includes two surrounding portions extending to surround the lower surface of the clip at positions corresponding to the pivot axis about which the clip 17 rotates, components are stacked in the vertical direction. This increases the height of the wiper blade from the wiped surface. As compared with such a wiper blade, the wiper blade 3 of the present embodiment lowers the height of the wiper blade 3 from the wiped surface. As compared with the wiper arm including surrounding portions, the shape of the distal coupling portion 4 of the wiper arm 2 can be simplified. This facilitates manufacturing of the wiper arm 2.

(14) The blade holder 13 includes the retaining wall portion 13*g* which abuts, in the longitudinal direction, against the retaining portion (projections 4*d*) formed on the distal coupling portion 4 in a state in which the distal coupling portion 4 is present in the longitudinal position when the engagement recess 4*c* is not engaged with the engagement projection 17*f*. Thus, the clip 17 (and thus, wiper blade 3) cannot easily be separated from the distal coupling portion 4. More specifically, in the above structure, the distal coupling portion 4 of the wiper arm 2 is first moved downward relative to the clip 17. Then, the distal coupling portion 4 is relatively moved in the longitudinal direction. This engages the engagement recess 4*c* with the engagement projection 17*f*, and the distal coupling portion 4 is coupled to the clip 17. When the distal coupling portion 4 of the wiper arm 2 is first moved relative to the clip 17 in the longitudinal direction to remove the engagement recess 4c from the engagement projection 17f and the distal coupling portion 4 is then relatively moved upward, the distal coupling portion 4 is removed from the clip 17. In a state in which the vehicle wiper 1 is mounted on the vehicle, for example, even if the clip 17 is moved in the longitudinal direction relative to the distal coupling portion 4, the distal coupling portion 4 is less prone to be relatively moved upward by the biasing force that is applied to the wiper arm 2 by the biasing mechanism (not shown). Thus, the clip 17 (i.e., wiper blade 3) is not easily separated from the distal coupling portion 4.

(15) A lower end surface of the clip 17, which is located at a position separated from the pivot axis of the rotating clip 17, is the upper lower end surface 17i, which is higher than the lower end surface (arc surface 17h) at a position corresponding to the pivot axis. This becomes possible since there is no pivotal coupling portion (support shaft 17c) arranged at a position corresponding to the pivot axis. The projections 4d, which serve as the retaining portion, projects to abut against the upper lower end surface 17i in a state in which the distal coupling portion 4 is coupled to the clip 17. Hence, in addition to the engagement recess 4c and the engagement projection 17f, the upper covering wall 4a and the projections 4d restrict movement of the wiper arm 2 (distal coupling portion 4) in the vertical direction relative to the clip 17. Thus, in the coupled state, movement of the wiper arm 2 (distal coupling portion 4) in the vertical direction relative to the clip 17 is restricted in the coupled state.

(16) The projection 4d is arranged so as to abut against the lower end of the guide projection 17j of the clip 17. In this structure, the projection 4d abuts against one of terminal ends of the guide groove 13f. This restricts pivoting of the clip 17 relative to the blade holder 13. Hence, the pivoting can be restricted within a preset range while increasing the rigidity of the projection 4d and the guide projection 17j.

(17) The resilient projection 17k is formed on the upper wall 17b of the clip 17. The fitted hole 4e is formed in the upper covering wall 4a of the distal coupling portion 4. The resilient projection 17k is fitted into the fitted hole 4e, and the resilient projection 17k is engaged with the fitted hole 4e in the longitudinal direction in a state in which the resilient projection 17k is not bent downward. Thus, as long as external force is not applied to the resilient projection 17k, the distal coupling portion 4 and the clip 17 relatively move in the longitudinal direction.

It should be apparent to those skilled in the art that the present invention may be embodied in many other specific forms without departing from the spirit or scope of the invention. Particularly, it should be understood that the present invention may be embodied in the following forms.

In the above embodiment, the notch 17g that allows the clip 17 to pivot is formed in the upper wall 17b of the clip 17. However, the invention is not limited to such a structure. For example, a recess that allows pivoting may be formed in an upper surface of the lever main body 13b.

In the above embodiment, the arc surfaces 17h are formed on the lower end surfaces of the two sidewalls 17a of the clip 17, and the opposing surfaces 13j opposed to the arc surfaces 17h are formed on the blade holder 13. However, the invention is not limited to this structure. For example, the arc surfaces 17h and the opposing surfaces 13j do not have to be formed.

In the above embodiment, the curved coupling portion 13l, which is smoothly coupled to the fin portion 16 of the case 15, is formed on the blade holder 13. However, the invention is not limited to such a structure. For example, the curved coupling portion 13l does not have to be formed on the blade holder. Further, the case 15 includes the fin portion 16. However, the invention is not limited to such a configuration. For example, when the wiper 1 is applied to a vehicle wiper that wipes a rear window, the case does not have to include the fin portion 16.

In the above embodiment, upper end surfaces of the coupling portions between the case 15 (including fin portion 16) and the blade holder 13 (curved coupling portion 13l) are flush with each other. However, the invention is not limited to such a structure. For example, the upper end surfaces of the coupling portions may include a step. The step portion 15b extending in the longitudinal direction is formed on the case 15 (including fin portion 16) to cover the upper surface of the step portion 15b with the blade holder 13 (curved coupling portion 13l). However, the invention is not limited to such a structure. For example, the step portion 15b does not have to be formed.

In the present embodiment, the blade holding portion 13a and the case holding portion 15a surround the base portion 11b and the backing 12 in a state in which the backing 12 abuts against the upper end surface of the base portion 11b of the wiper strip 11. However, the invention is not limited to such a structure. For example, a wall may be arranged between the wiper strip 11 and the backing 12. The wall may be formed integrally with or separately from the blade holding portion 13a and the case holding portion 15a.

In the above embodiment, the lap portions 4f extend downward in the vertical direction to positions corresponding to the backing 12 formed on the distal coupling portion 4 of the wiper arm 2. However, the invention is not limited to such a structure. The lap portions 4f do not have to be formed on the distal coupling portion.

In the above embodiment, the backing 12 and the blade holder 13 are coupled so that they are engaged with each other in the longitudinal direction, and the support part 14 restricts relative movement of the backing 12 and the blade holder 13 in the longitudinal direction. However, the invention is not limited to such a structure. For example, a resilient engaging portion for restricting the movement in the longitudinal direction relative to the backing may be formed integrally with the blade holder.

In the above embodiment, the engagement projections 17f are formed on the two sidewalls 17a of the clip 17, and the engagement recesses 4c are formed on the two side covering walls 4b of the distal coupling portion 4. The engagement recesses 4c are engaged with the engagement projections 17f in the vertical direction by coupling the distal coupling portion 4 with the clip 17 along the longitudinal direction. However, the invention is not limited to such a structure. For example, another structure that engages the clip 17 and the distal coupling portion 4 in the vertical direction may be used.

In the above embodiment, the clip 17 includes the separation restriction portion 17e (distal end of support shaft 17c) that restricts upward separation of the support part 14. However, the invention is not limited to such a structure. For example, the clip does not have to include the separation restriction portion 17e. In this case, the support part (movement restriction member) may include a retaining hook that engages with the blade holder. The retaining hook restricts separation of the support part in a direction opposite to the coupling direction of the support part. This structure facilitates the coupling of the wiper blade and automatically restricts separation of the support part (movement restriction member). Further, the support part (movement restriction member) may be press-fitted and fixed, for example. Alternatively, the support part (movement restriction member) may be adhered and fixed, for example.

For example, the clip 17 does not have to include the separation restriction portion 17e, and the movement restriction member may be formed integrally with the clip 17. In this structure, the number of parts is less than when the support part 14 (movement restriction member) is a discrete member.

The separation restriction portion 17e is the distal portion of the support shaft 17c inserted into the shaft insertion hole 13e of the blade holder 13 to pivotally support the clip 17. However, the invention is not limited to such a structure. For example, as long as separation of the support part 14 can be restricted, the separation restriction portion may be arranged another portion of the clip 17, that is, a portion that differs from the support shaft 17c.

Figure 12A:
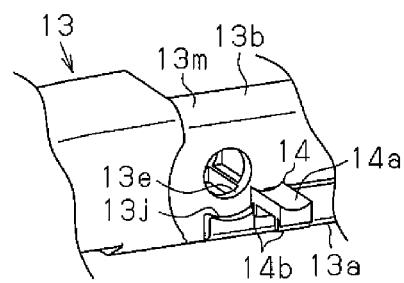
FIGS. 12A to 12C are partial perspective views showing another example of a vehicle wiper.
Figure 12B:
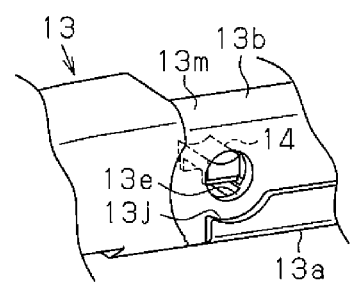
Figure 12C:
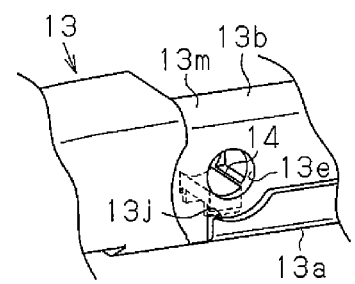

In the above embodiment, the vertical passage 13c extends through the lever main body 13b until coming into communication with the blade holding portion 13a. The support part 14 is inserted into the vertical passage 13c from above the lever main body 13b, and the support part 14 is fitted into the support part accommodation portion 13d. However, the invention is not limited to such a structure. The support part 14 may be fitted into another structure. As shown in FIGS. 12A to 12C, for example, the vertical passage 13c of the blade holder 13 is closed by an upper end wall 13m. In this case, the support part 14 is first inserted (see FIG. 12B) into the lever main body 13b through the shaft insertion hole 13e in the lateral direction as shown in FIG. 12A. Then, the support part 14 is lowered toward the support part accommodation portion 13d below the support part 14 (see FIG. 3) and fitted into the support part accommodation portion 13d (see FIG. 12C). In this structure, the support part 14 may be engaged with the backing 12 (backing engaging portion 12a) and the blade holder 13 (support part accommodation portion 13d) in the longitudinal direction. In this structure, the vertical passage 13c does not extend upward, and the lever main body 13b includes the upper end wall 13m. Thus, the rigidity of the blade holder 13 (lever main body 13b) can be increased.

The support shaft 17c of the above embodiment has a simple cylindrical shape. However, the invention is not limited to such a structure. For example, the distal end of support shaft may include an inclined surface to improve the coupling properties.

Figure 13A:
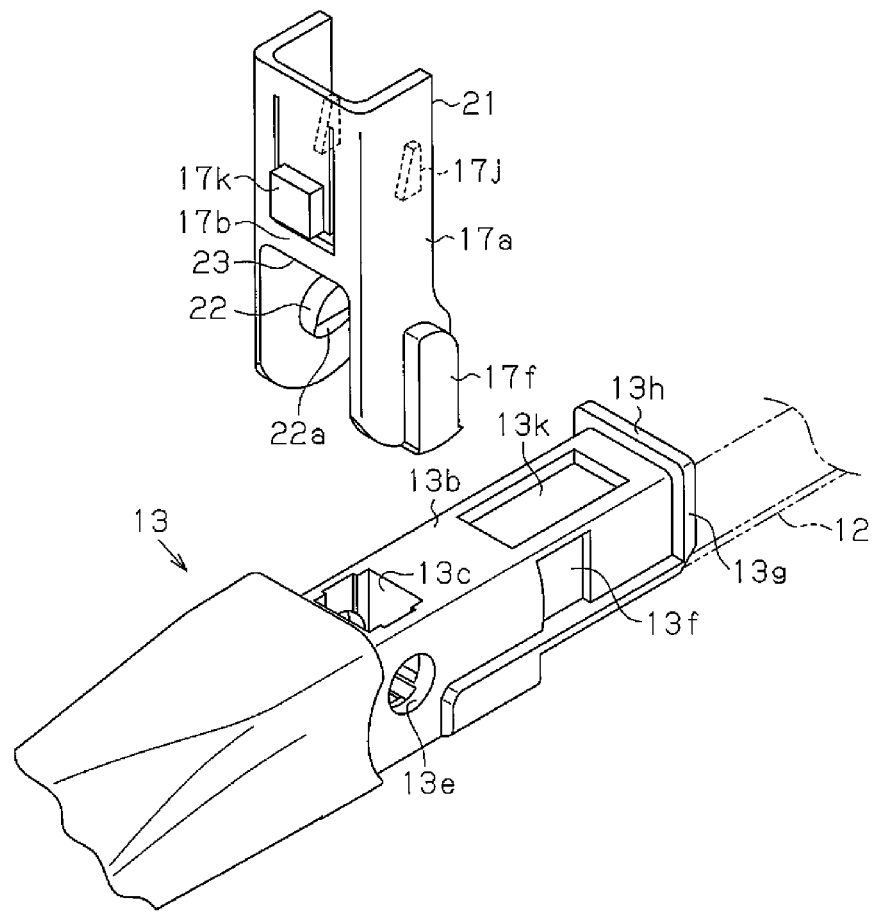
FIG. 13A is a perspective view showing a blade holder and a clip prior to coupling.
Figure 13B:
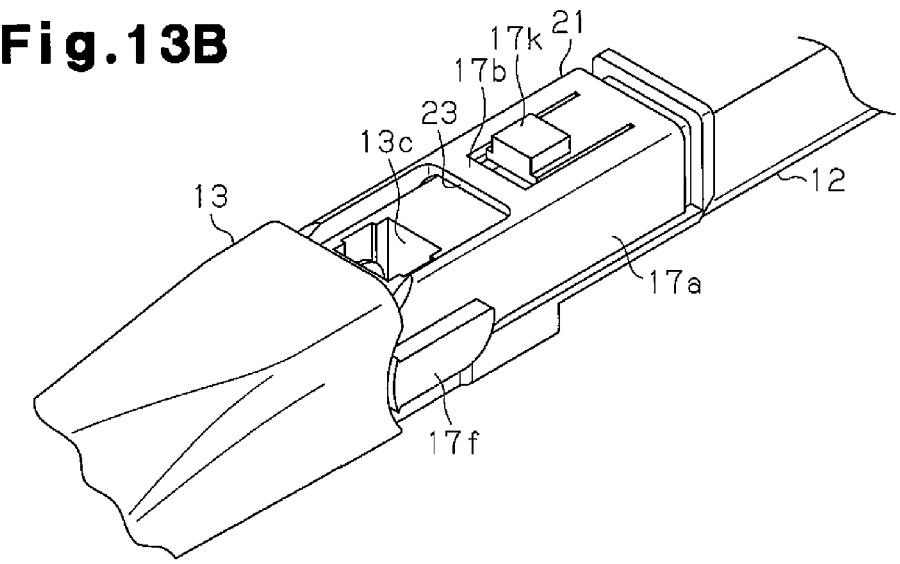
FIG. 13B is a perspective view corresponding to a usage state after a blade holder and a clip are coupled in another example.

More specifically, as shown in FIGS. 13A to 14B, a clip 21, which serves as a coupling member, includes support shafts 22. Each support shaft 22 has a distal end including an inclined surface 22a. In a usage state after coupling (see FIG. 13B), the inclined surface 22a decreases the height of the support shaft 22 in a direction that differs from the direction of the wiped surface. In the same manner as the above embodiment, when the guide projections 17j are fitted in the guide grooves 13f in the usage state after coupling as shown in FIGS. 13B and 14A, the clip 21 is arranged to be generally horizontal in the longitudinal direction together with the blade holder 13. As shown in FIGS. 13A and 14A, the inclined surface 22a is formed to decrease the height of the support shaft 22 toward a first longitudinal end of the clip 21. The inclined surface 22a is formed in generally one half of the distal surface (top surface) of the support shaft 22. The remaining half of the distal end is flat so that the height of the support shaft 22 is fixed. The clip 21 further includes a notch 23 that is larger than the notch 17g of the above embodiment. The notch 23 allows the two support shafts 22 to be easily bent away from each other. Further, as shown in FIG. 13A, in a state in which the clip 21 is orthogonal to the blade holder 13, the notch 17g allows the support shafts 22 to be fitted into and coupled to the insertion holes 13e. This example does not include the arc surfaces 17h and the opposing surfaces 13j. This also allows for the coupling.

This structure improves the coupling properties while increasing the wear resistance. In detail, during coupling, as shown in FIGS. 13A and 14A, the support shafts 22 are coupled to the insertion hole 13e from a lower side to a higher side. In other words, the support shafts 22 are fitted into and coupled to the insertion holes 13e in a state in which the clip 21 is orthogonal to the blade holder 13. This facilitates the coupling. Further, in a coupling state after the coupling in which the guide projections 17j are fitted to the guide grooves 13f as shown in FIG. 14B, even when force is transmitted from the support shafts 22 to the insertion holes 13e in the direction of the wiped surface, the support shafts 22 contact and move over a wider area than when the inclined surfaces 22a are inclined in the direction of the wiped surface. This improves the wear resistance.

Further, in the same manner as the above embodiment, in this example, as shown in FIG. 14B, each support shaft 22 includes a distal portion that defines a separation restriction portion 22b. Thus, the formation of the inclined surface 22a further ensures that separation of the support part 14 in the upward direction, which is opposite the direction of the wiped surface, is restricted.

The guide projection 17j of the above embodiment and the modified example described above may include an inclined surface formed in a bottom corner located toward the wiped surface in a usage state after coupling.

In the above embodiment, the distal coupling portion 4 includes the projections 4d, which serve as the retaining portions, and the blade holder 13 includes the retaining wall portion 13g. However, the invention is not limited to such a structure. For example, the distal coupling portion 4 does not have to include the projections 4d, and the blade holder 13 does not have to include the retaining wall portion 13g.

In the above embodiment, the retaining portion is the projection 4d that projects and abuts against the upper lower end surface 17i of the clip 17. However, the invention is not limited to such a structure. For example, slits extending in the longitudinal direction and having open ends may be formed in the two sidewalls 17a of the clip 17, and projections may be arranged on the side covering walls 4b so that the projections are movable in the slits in the longitudinal direction.

In the above embodiment, the projections 4d are arranged so that they abut against the lower ends of the guide projections 17j of the clip 17. However, the invention is not limited to such a structure. For example, the projections 4d may be located at positions deviated from the lower ends of the guide projections 17j.

The present examples and embodiments are to be considered as illustrative and not restrictive, and the invention is not to be limited to the details given herein, but may be modified within the scope and equivalence of the appended claims.

The invention claimed is:

1. A wiper blade comprising:
an elongated wiper strip including a base portion and a wiping portion, which wipes a wiped surface;
a leaf spring backing that extends along a longitudinal direction of the wiper strip and provides the wiper strip with rigidity and resilience;
a blade holder directly or indirectly coupled to a wiper arm, wherein the blade holder is coupled to the backing to restrict movement of the backing in the longitudinal direction, the blade holder includes a blade holding portion that surrounds the base portion of the wiper strip and the backing at a longitudinally central portion of the wiper strip and the backing, and the blade holding portion holds the wiper strip and the backing to restrict movement of the wiper strip and the backing in a direction orthogonal to the longitudinal direction;

two cases opposed to each other and arranged at two longitudinal ends of the blade holder, wherein each of the cases includes a case holding portion surrounding the base portion of the wiper strip and the backing, and each case holding portion holds the wiper strip and the backing to restrict movement of the wiper strip and the backing in the direction orthogonal to the longitudinal direction;

a movement restriction member coupled to and engaged in the longitudinal direction with the backing and the blade holder to restrict relative movement of the backing and the blade holder in the longitudinal direction; and a coupling member that is pivotally coupled to the blade holder and coupled to the wiper arm, wherein the movement restriction member is fitted and coupled to the backing and the blade holder in a certain direction, and the coupling member includes a separation restriction portion that restricts separation of the movement restriction member in a direction opposite the certain direction.

2. The wiper blade according to claim 1, wherein the two cases are made of a resilient resin material, each of the cases is resiliently deformable toward the wiped surface to follow plastic deformation of the backing toward the wiped surface, and the blade holding portion has rigidity that is higher than that of each case.

3. The wiper blade according to claim 2, wherein the blade holder has a rigidity that is higher than that of each case.

4. The wiper blade according to claim 1, further comprising two caps respectively engaged with two longitudinal ends of the backing, wherein the backing is fitted into the two cases in the longitudinal direction, the cases are arranged between the blade holder and the two caps, and the cases are arranged in an immovable state in the longitudinal direction relative to the backing due to the cap and the blade holder.

5. The wiper blade according to claim 1, further comprising a coupling member that is pivotally coupled to the blade holder and coupled to the wiper arm, wherein the coupling member includes two sidewalls, which respectively extend along two side surfaces of the blade holder from a pivot axis, and an upper wall, which connects the two sidewalls and extends along an upper surface of the blade holder, and a notch is formed in an end portion of the upper wall located toward the pivot axis allowing for pivoting of the coupling member.

6. The wiper blade according to claim 1, further comprising a coupling member that is pivotally coupled to the blade holder and coupled to the wiper arm, wherein the coupling member includes two sidewalls, which respectively extend along two side surfaces of the blade holder from a pivot axis, and an upper wall, which connects the two sidewalls and extends along an upper surface of the blade holder, a pivotal coupling portion is arranged in two side surfaces of the blade holder and two sidewalls of the coupling member at positions corresponding to the pivot axis, the pivotal coupling portion pivotally couples the blade holder and the coupling member to each other, each of the two sidewalls of the coupling member includes, in a lower end surface, an arc surface extending around the pivot axis, and the blade holder includes opposing surfaces that are opposed to the arc surfaces.

7. The wiper blade according to claim 1, wherein each of the cases includes a fin portion that converts a traveling air stream into a pressing force acting toward the wiped surface, and the blade holder includes a curved coupling portion that is continuous with the fin portion.

8. The wiper blade according to claim 1, wherein the blade holding portion and the case holding portion surround the base portion and the backing in a state in which the backing abuts against an upper end surface of the base portion of the wiper strip.

9. The wiper blade according to claim 1, wherein the blade holder includes a shaft insertion hole, which is formed at a position corresponding to a pivot axis of the coupling member, and a support part accommodation portion, which is in communication with the shaft insertion hole, the movement restriction member is coupled to and accommodated in the support part accommodation portion, the coupling member includes a support shaft that is inserted into the shaft insertion hole, the coupling member is pivotally supported by the blade holder through the support shaft, and the support shaft functions as the separation restriction portion.

10. The wiper blade according to claim 9, wherein the movement restriction member is coupled to and accommodated in the support part accommodation portion through the shaft insertion hole.

11. The wiper blade according to claim 1, wherein the blade holder includes a shaft insertion hole formed at a position corresponding to a pivot axis of the coupling member, the coupling member includes two support shafts inserted into the shaft insertion holes, the two support shafts pivotally support the coupling member on the blade holder, the support shafts each include a distal end, and the distal end of each support shaft includes an inclined surface that is inclined so that a height of the support shaft decreases in a direction that differs from the direction of the wiped surface in a usage state after coupling.

12. The wiper blade according to claim 11, wherein the coupling member is arranged to be generally horizontal in its longitudinal direction in a usage state after coupling, and the inclined surface is formed so that the height of the support shaft decreases toward a first longitudinal end of the coupling member.

13. A vehicle wiper comprising:

the wiper blade according to claim 1, and the wiper arm including a distal coupling portion, wherein the distal coupling portion includes two lap portions extending downward to a position corresponding to the backing in a vertical direction.

14. The wiper blade according to claim 1, wherein the movement restriction member is fitted and coupled to the backing and the blade holder in a direction that intersects with the wiped surface, and the coupling member includes a separation restriction portion that restricts separation of the movement restriction member in the direction that intersects with the wiped surface.

15. The wiper blade according to claim 1, wherein
the movement restriction member is fitted and coupled to the backing and the blade holder from above the wiped surface, and
the coupling member includes a separation restriction portion that restricts upward separation of the movement restriction member.

16. A wiper blade comprising:
an elongated wiper strip including a base portion and a wiping portion, which wipes a wiped surface;
a leaf spring backing that extends along a longitudinal direction of the wiper strip and provides the wiper strip with rigidity and resilience;
a blade holder directly or indirectly coupled to a wiper arm, wherein the blade holder is coupled to the backing to restrict movement of the backing in the longitudinal direction, the blade holder includes a blade holding portion that surrounds and engages the base portion of the wiper strip and the backing at a longitudinally central portion of the wiper strip and the backing, and the blade holding portion holds the wiper strip and the backing to restrict movement of the wiper strip and the backing in a direction orthogonal to the longitudinal direction; and
two cases opposed to each other and arranged at two longitudinal ends of the blade holder, wherein each of the cases includes a case holding portion surrounding the base portion of the wiper strip and the backing, and each case holding portion holds the wiper strip and the backing to restrict movement of the wiper strip and the backing in the direction orthogonal to the longitudinal direction, wherein
the cases and the blade holder include coupling portions that are opposed to each other,
the coupling portions include upper end surfaces that are flush with each other,
one of the case and the blade holder includes a step extending in the longitudinal direction, and
the step includes an upper surface covered by the other one of the case and the blade holder.

17. The wiper blade according to claim 16, wherein
the two cases are made of a resilient resin material,
each of the cases is resiliently deformable toward the wiped surface to follow resilient deformation of the backing toward the wiped surface, and
the blade holding portion has rigidity that is higher than that of each case.

18. The wiper blade according to claim 17, wherein the blade holder has a rigidity that is higher than that of each case.

19. The wiper blade according to claim 16, further comprising two caps respectively engaged with two longitudinal ends of the backing, wherein
the backing is fitted into the two cases in the longitudinal direction,
the cases are arranged between the blade holder and the two caps, and
the cases are arranged in an immovable state in the longitudinal direction relative to the backing due to the cap and the blade holder.

20. The wiper blade according to claim 16, further comprising a coupling member that is pivotally coupled to the blade holder and coupled to the wiper arm, wherein
the coupling member includes two sidewalls, which respectively extend along two side surfaces of the blade holder from a pivot axis, and an upper wall, which connects the two sidewalls and extends along an upper surface of the blade holder, and
a notch is formed in an end portion of the upper wall located toward the pivot axis allowing for pivoting of the coupling member.

21. The wiper blade according to claim 16, further comprising a coupling member that is pivotally coupled to the blade holder and coupled to the wiper arm, wherein
the coupling member includes two sidewalls, which respectively extend along two side surfaces of the blade holder from a pivot axis, and an upper wall, which connects the two sidewalls and extends along an upper surface of the blade holder,
a pivotal coupling portion is arranged in two side surfaces of the blade holder and two sidewalls of the coupling member at positions corresponding to the pivot axis, the pivotal coupling portion pivotally couples the blade holder and the coupling member to each other,
each of the two sidewalls of the coupling member includes, in a lower end surface, an arc surface extending around the pivot axis, and
the blade holder includes opposing surfaces that are opposed to the arc surfaces.

22. The wiper blade according to claim 16, wherein
each of the cases includes a fin portion that converts a traveling air stream into a pressing force acting toward the wiped surface, and
the blade holder includes a curved coupling portion that is continuous with the fin portion.

23. A vehicle wiper comprising:
the wiper blade according to claim 16, and
the wiper arm including a distal coupling portion, wherein the distal coupling portion includes two lap portions extending downward to a position corresponding to the backing in a vertical direction.

* * * * *